United States Patent [19]
Topchiashvili et al.

[11] 3,956,195
[45] May 11, 1976

[54] FOAMED POLYMER SEMICONDUCTOR COMPOSITION AND A METHOD OF PRODUCING THEREOF

[76] Inventors: Mikhail Izmailovich Topchiashvili, ulitsa Tashkentskaya, 27/12, pod'ezd, 3; Taisia Fedorovna Datsko, pereulok Dekabristov, 1; Givi Mikhailovich Kikvilashvili, ulitsa Griboedova, 30; Ledi Alexeevna Maisuradze, ulitsa Tashkentskaya, 27/12, pod'ezd 1, kv. 3, all of Tbilisi, U.S.S.R.

[22] Filed: Feb. 21, 1974

[21] Appl. No.: 444,665

[52] U.S. Cl................................. 252/511; 260/2.5 EP
[51] Int. Cl.²........................................... H01B 1/04
[58] Field of Search................ 252/511; 260/2.5 EP

[56] References Cited
UNITED STATES PATENTS

| | | | |
|---|---|---|---|
| 3,154,504 | 10/1964 | Carey et al. | 260/2.5 EP |
| 3,223,654 | 12/1965 | Nickerson et al. | 260/2.5 EP |
| 3,420,794 | 1/1969 | May et al. | 260/2.5 EP X |
| 3,671,464 | 6/1972 | Gilchrist | 252/511 |

*Primary Examiner*—Richard D. Lovering
*Assistant Examiner*—E. Suzanne Parr
*Attorney, Agent, or Firm*—Haseltine, Lake & Waters

[57] ABSTRACT

A foamed polymer semiconductor composition, characterized in that it has the following formulation, in weight parts:

| | |
|---|---|
| epoxy resin | 100 |
| electrically conductive black or graphite | 10–60 |
| polyethylhydridesiloxane | 0.1–50 |
| polyethylenepolyamine | 10–25 |
| organic solvent | 0–50 |

After mixing the above-mentioned components self-foaming of the composition takes place and then its hardening follows. The composition has electric specific resistance in the range of 10 to $10^{12}$ ohm.cm.

The present composition will find wide application in civil and hydraulic engineering for plugging up cracks in concrete and reinforced concrete structures.

2 Claims, No Drawings

FOAMED POLYMER SEMICONDUCTOR COMPOSITION AND A METHOD OF PRODUCING THEREOF

The present invention relates to electrically conductive polymer materials and more particularly to foamed polymer semiconductor compositions and methods of their production.

The above-mentioned composition may be employed in various engineering fields, for example, in rocketry and aircraft engineering as a heat-insulating material, as a material to remove static electricity and that to absorb radiowaves.

Moreover, it may be used in civil and hydraulic engineering for plugging up cracks in concrete and reinforced concrete structures.

Known in the art is a foamed polymer semiconductor composition based on epoxy resin, which includes electrically conductive black and a hardener, viz. polyethylenepolyamine.

A disadvantage of such a composition lies in the fact it has insufficient heat resistance and is produced by the method requiring additional expenses to carry out, foaming of the components.

The method of producing the above-mentioned composition consists in blending epoxy resin with electrically conductive black and polyethylenepolyamine; the resulting mixture being foamed by a gas introduced into it, for example, by some inert gas.

Such a technological procedure of foaming presents difficulties in the way of controlling the size of pores in the produced material and does not allow the obtaining of material with uniform electric properties.

It is an object of the present invention to provide such a foamed polymer semiconductor material in which foaming would be effected as a result of chemical interaction of its components.

The present invention is aimed at eliminating the above-mentioned disadvantages.

It is therefore the specific object of the invention to provide such a formulation of a polymer semiconductor composition, in which foaming would be performed as a result of chemical interaction of its components.

Said specific object is accomplished by the provision of a foamed polymer semiconductor composition based on epoxy resin, including a carbon component and a hardener, namely, polyethylenepolyamine, which composition, according to the invention, includes polyethylhydridesiloxane and features the following formulation, in weight parts:

| | |
|---|---|
| 1. Epoxy resin | 100 |
| 2. Electrically conductive black or graphite | 10–60 |
| 3. Polyethylhydridesiloxane | 0.1–50 |
| 4. Polyethylenepolyamine | 10–25 |
| 5. Organic solvent | 0–50 |

The material of the above-mentioned formulation possesses an enhanced head resistance due to presence of said polyethylhydridesiloxane in it.

Specific electric resistance of the material lies within a wide range from 10 to $10^{12}$ ohm.cm, and the electrical porperties are distributed practically uniformly over the whole volume of the material.

The material of the said composition has a relatively uniform porosity strictly governed by the content of polyethylhydridesiloxane. Thus, for example, with the content of polyethylhydridesiloxane being 10 weight parts, the volume of the hardened mass increases approximately 8-10 times as compared with hardened mass without the said organosilicon compound. Such a composition easily fills a mould of any intricate configuration and practically does not shrink.

An important advantage of the proposed material is an extreme simplicity of the method, of its production.

According to the invention the method is as follows. 100 weight parts of epoxy resin or its solution in an organic solvent are mixed with 10–60 weight parts of electrically conductive black or graphite, 0.1–50 weight parts of polyethylhydridesiloxane and then 10–25 weight parts of polyethylenepolyamine are introduced into the resulting mixture. After several seconds, foaming takes place due to the chemical reaction between polyethylenepolyamine and polyethylhydridesiloxane, and then the composition hardens filling any mould and exhibiting high adhesive properties. Such properties of the material are particularly important in responsible structures.

Polyethylhydridesiloxane used to produce the material proposed is a product of cohydrolysis of ethylhydridedietoxysilane with ethyltrietoxysilane or a product of cohydrolysis of ethylhydridedichlorsilane with ethyltrichlorosilane.

Acetone or dichloroethane or benzene, its homologues and other similar compounds can be used as an organic solvent for the epoxy resin.

For a better understanding of the present invention by those skilled in the art, examples of producing the proposed material are given hereinbelow by way of illustration.

EXAMPLE 1

100 weight parts of epoxy resin are charged into a mixer and 10 weight parts of electrically conductive black are added thereto; the mixture is agitated until a homogeneous mass is obtained 1 weight part of polyethylhydridesiloxane is introduced into the resulting mixture, the mixture is agitated, and 15 weight parts of polyethylenepolyamine are introduced into it. The mixture of all the components is thoroughly stirred. The desired mould is filled with the resulting mixture. In about 30 sec. self-foaming of the composition takes place, followed by its hardening. The resulting foamed material has a specific electric resistance $\rho = 10^7$ ohm.cm.

All operations of the method are performed under usual conditions, i.e. under normal pressure and room temperature.

EXAMPLE 2

100 weight parts of epoxy resin are charged into a mixer and 30 weight parts of acetone are added. 60 weight parts of electrically conductive black, then 10 weight parts of polyethylhydridesiloxane are introduced into the resulting solution, mixed and 20 weight parts of polyethylenepolyamine are added. After 30 sec. the composition gets self-foamed, and then hardened.

The resulting foamed material has a specific electric resistance $\rho = 10^2$ ohm.cm.

We claim:
1. A foamed polymer semiconductor composition having a formulation, in weight parts:

| | |
|---|---|
| epoxy resin | 100 |
| electrically conductive black or graphite | 10–60 |
| polyethylhydridesiloxane | 0.1–50 |
| polyethylenepolyamine | 10–25 |
| organic solvent for epoxy resins | 0–50 |

2. A method of producing a foamed polymer semiconductor composition according to claim 1 comprising mixing 100 parts by weight of epoxy resin and, optionally, 0 to 50 parts by weight of an organic solvent for said epoxy resin with 10 to 60 parts by weight of electrically conductive black or graphite and agitating the mixture until a homogeneous mass is obtained, adding to the mixture 0.1 through 50 parts by weight of polyethylhydridesiloxane and 10 through 25 parts by weight of polyethylenepolyamine, agitating the mixture until a homogeneous distribution of the polyethylhydridesiloxane and polyethylenepolyamine in the mixture is obtained and allowing said mixture to foam and subsequently harden to form said foamed polymer semiconductor composition.

\* \* \* \* \*